(12) United States Patent
Isoda

(10) Patent No.: US 12,206,145 B2
(45) Date of Patent: Jan. 21, 2025

(54) FUEL CELL SYSTEM

(71) Applicant: NISSAN MOTOR CO., LTD., Yokohama (JP)

(72) Inventor: Hiroyuki Isoda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/291,437

(22) PCT Filed: Jul. 26, 2021

(86) PCT No.: PCT/JP2021/027584
§ 371 (c)(1),
(2) Date: Jan. 23, 2024

(87) PCT Pub. No.: WO2023/007555
PCT Pub. Date: Feb. 2, 2023

(65) Prior Publication Data
US 2024/0266578 A1   Aug. 8, 2024

(51) Int. Cl.
*H01M 8/04* (2016.01)
*H01M 8/00* (2016.01)
*H01M 8/04082* (2016.01)
*H01M 8/04701* (2016.01)
*H01M 8/04746* (2016.01)
*H01M 8/2485* (2016.01)

(52) U.S. Cl.
CPC ......... *H01M 8/2485* (2013.01); *H01M 8/004* (2013.01); *H01M 8/04201* (2013.01); *H01M 8/04708* (2013.01); *H01M 8/04753* (2013.01)

(58) Field of Classification Search
CPC .............. H01M 8/2485; H01M 8/004; H01M 8/04201; H01M 8/04708
See application file for complete search history.

(56) References Cited

U.S. PATENT DOCUMENTS

| | | | |
|---|---|---|---|
| 7,422,812 B2 | 9/2008 | Haltiner, Jr. et al. | |
| 2018/0358640 A1 | 12/2018 | Shiomi | |
| 2019/0252713 A1 | 8/2019 | Satake | |
| 2023/0006226 A1* | 1/2023 | Postlethwaite | H01M 8/04738 |

FOREIGN PATENT DOCUMENTS

| | | |
|---|---|---|
| JP | 2016-091889 A | 5/2016 |
| JP | 2017-183222 A | 10/2017 |
| JP | 2020-053234 A | 4/2020 |
| WO | WO-2017/104301 A1 | 6/2017 |
| WO | WO-2018/051468 A1 | 3/2018 |

* cited by examiner

*Primary Examiner* — Olatunji A Godo
(74) *Attorney, Agent, or Firm* — Foley & Lardner LLP

(57) ABSTRACT

A fuel cell system includes: a fuel cell unit including a fuel cell, an anode flow path, a cathode flow path, and a heat exchanger configured to heat the cathode gas to be supplied to the fuel cell; and a manifold attached to the fuel cell unit and configured to distribute and supply the cathode gas to the cathode flow path. The cathode flow path includes a main flow path passing through the heat exchanger, a bypass flow path bypassing the heat exchanger and connected to the main flow path, and a partial reformation flow path through which a gas for partial oxidation reformation is supplied to the anode flow path.

16 Claims, 7 Drawing Sheets

FUEL CELL SYSTEM

TECHNICAL FIELD

The present invention relates to a fuel cell system.

BACKGROUND ART

WO2018/051468A1 discloses a fuel cell system in which a cathode flow path through which cathode gas (air) flows includes a path (main flow path) passing through a heat exchanger, a path (bypass flow path) bypassing the heat exchanger, and a path (POX flow path) that supplies air for partial reformation to an anode flow path.

SUMMARY OF INVENTION

When the cathode flow path of the fuel cell system includes a bypass flow path, a POX flow path, or the like, it is important to design a pressure loss in order to satisfy a necessary flow rate on a downstream side of these flow paths. However, in WO2018/051468A1, the design of a pressure loss is not considered in a structure in which the cathode flow path is branched into the main flow path, the bypass flow path, and the POX flow path. Therefore, there is a risk that it becomes difficult to design a pressure loss of a flow path, such as the POX flow path, which requires relatively high accuracy in gas flow rate control.

In view of the above problems, an object of the present invention is to provide a fuel cell system in which design of a pressure loss in a cathode flow path is facilitated.

According to an aspect of this invention, there is provided a fuel cell system comprising a fuel cell unit including a fuel cell, an anode flow path through which an anode gas is supplied to the fuel cell, a cathode flow path through which a cathode gas is supplied to the fuel cell, and a heat exchanger configured to heat the cathode gas to be supplied to the fuel cell and a manifold attached to the fuel cell unit and configured to distribute and supply the cathode gas to the cathode flow path. The cathode flow path includes a main flow path passing through the heat exchanger, a bypass flow path bypassing the heat exchanger and connected to the main flow path, and a partial reformation flow path through which a gas for partial oxidation reformation is supplied to the anode flow path. The manifold is configured as a gas distribution member including, in order from an upstream side, a first flow path connected to the main flow path, a second flow path provided adjacent to the first flow path and connected to the bypass flow path, and a third flow path provided adjacent to the second flow path and connected to the partial reformation flow path. The manifold includes a communication path including a first communication path configured to connect the first flow path and the second flow path, and a second communication path configured to connect the second flow path and the third flow path.

DESCRIPTION OF EMBODIMENTS

Hereinafter, embodiments of the present invention will be described with reference to the drawings.

First Embodiment

Figure 1:
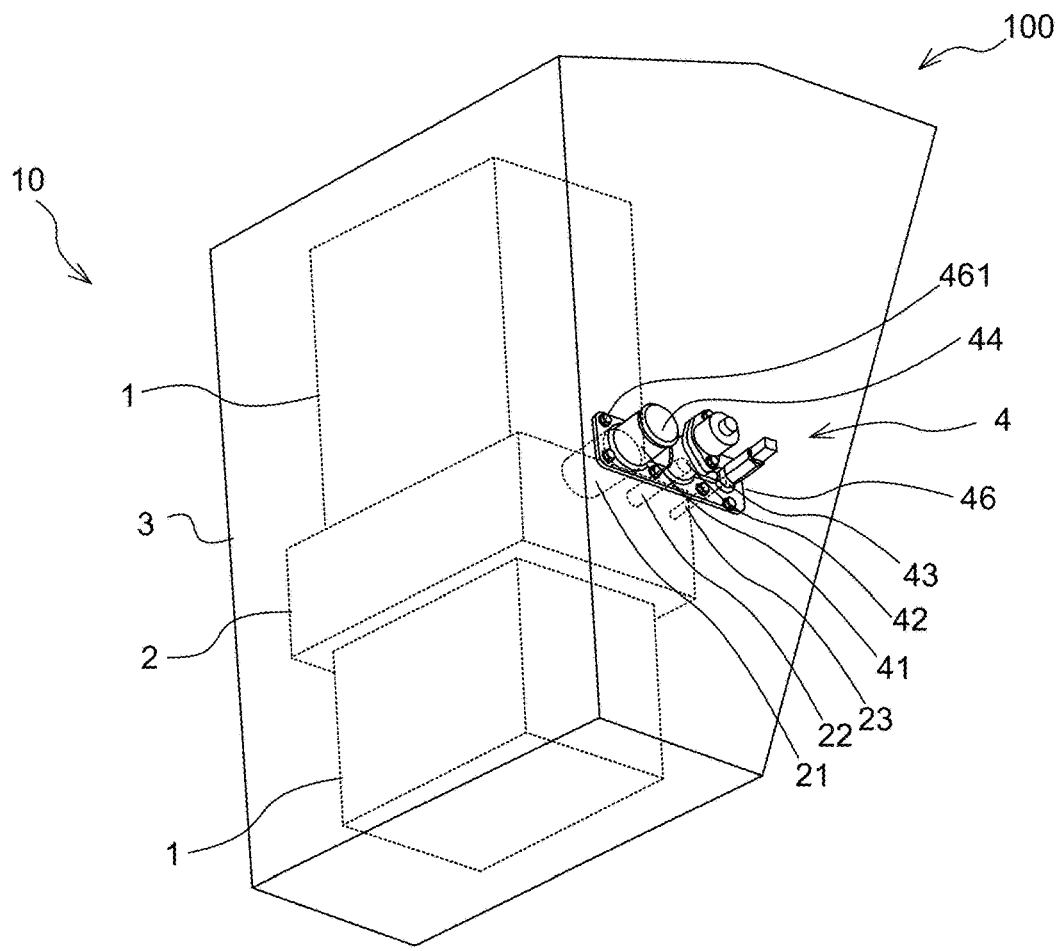
FIG. 1 is a schematic configuration diagram of a fuel cell system according to a first embodiment.

FIG. 1 is a schematic configuration diagram of a fuel cell system 100 according to a first embodiment. The fuel cell system 100 is a system that is mounted on, for example, a vehicle, supplies fuel gas (anode gas) and oxidant gas (cathode gas) required for power generation to fuel cell stacks 1, and causes the fuel cell stacks 1 to generate power in accordance with an electric load such as an electric motor for driving the vehicle.

As shown in FIG. 1, the fuel cell system 100 includes a fuel cell unit 10 including the two fuel cell stacks 1, an auxiliary machine structure 2, and a housing 3 that houses the fuel cell stacks 1 and the auxiliary machine structure 2, and a manifold 4 attached to the fuel cell unit 10.

The fuel cell stacks (fuel cell) 1 are disposed on an upper surface and a lower surface of the auxiliary machine structure 2, respectively. The fuel cell stack 1 is configured by laminating a plurality of fuel cells or fuel cell unit cells, and generates power by receiving supply of anode gas and cathode gas. Each fuel cell as a power generation source of the fuel cell stack 1 is, for example, a solid oxide fuel cell (SOFC).

The auxiliary machine structure 2 is a substantially rectangular parallelepiped structure made of a lump of metal or the like, and is interposed between the two fuel cell stacks 1. The auxiliary machine structure 2 includes a gas flow path including an anode flow path through which an anode gas is supplied to the fuel cell stack 1 and a cathode flow path through which a cathode gas is supplied to the fuel cell stack 1, and a heat exchanger that heats the cathode gas supplied to the fuel cell stack 1. The gas flow path built in the auxiliary machine structure 2 is connected to a gas supply path outside the auxiliary machine structure 2 via a side surface of the auxiliary machine structure 2, and is connected to the fuel cell stack 1 via an upper surface or a lower surface of the auxiliary machine structure 2. Accordingly, the anode gas and the cathode gas from the outside of the auxiliary machine structure 2 are supplied to the fuel cell stack 1 through the gas flow path inside the auxiliary machine structure 2. The auxiliary machine structure 2 may be further built with an exhaust flow path, a combustor, and the like, and the heat exchanger built in the auxiliary machine structure 2 may be a heat exchanger integrated with a combustor.

The cathode flow path built in the auxiliary machine structure 2 includes a main flow path 21 passing through the heat exchanger, a bypass flow path 22 bypassing the heat exchanger and connected to the main flow path 21, and a POX flow path (partial reformation flow path) 23 connected to the anode flow path. The main flow path 21 is a flow path through which the cathode gas heated by the heat exchanger is supplied to the fuel cell stack 1. The bypass flow path 22 is a flow path for adjusting a temperature of the cathode gas supplied to the fuel cell stack 1 by supplying, to the main flow path 21, unheated air (hereinafter, referred to as temperature-adjusted gas) bypassing the heat exchanger. The POX flow path 23 is a flow path through which gas for partial reformation (hereinafter referred to as reformed gas) is supplied to the anode flow path. One ends of the main flow path 21, the bypass flow path 22, and the POX flow path 23 extend from the inside of the auxiliary machine structure 2 to an inner peripheral surface of the housing 3 that houses the fuel cell unit 10.

The housing 3 is made of metal or the like, and houses the fuel cell stacks 1 and the auxiliary machine structure 2. The manifold 4 is fixed to the housing 3. The housing 3 includes a plurality of gas supply ports, and each of the gas supply ports is connected to a gas flow path such as the main flow path 21, the bypass flow path 22, and the POX flow path 23, which are built in the auxiliary machine structure 2. The fuel cell stacks 1, the auxiliary machine structure 2, and the housing 3 constitute the fuel cell unit 10.

The manifold 4 is a member that distributes and supplies the cathode gas to the cathode flow path in the auxiliary machine structure 2, and is attached to the housing 3 of the fuel cell unit 10. An inlet 44 of the manifold 4 is connected to a cathode gas supply source (not shown) such as a compressor. The manifold 4 includes, in order from an upstream side, a first flow path 41 connected to the main flow path 21 of the cathode flow path via the gas supply port of the housing 3, a second flow path 42 connected to the bypass flow path 22, and a third flow path 43 connected to the POX flow path 23. A reinforcing member for reinforcing connection portions between the first, second, and third flow paths 41, 42, and 43 of the manifold 4 and the cathode flow path of the fuel cell unit 10 may be provided between the manifold 4 and the housing 3. Details of the manifold 4 will be described later.

In the fuel cell system 100 configured as described above, air (cathode gas) taken in by an air supply device such as a compressor is supplied to the cathode flow path via the manifold 4.

Incidentally, when the cathode flow path of the fuel cell system includes a bypass flow path, a POX flow path, or the like, it is important to design a pressure loss in order to satisfy a required flow rate on a downstream side of these flow paths. Here, in a case where positions and structures of branching into the bypass flow path and the POX flow path are not appropriately set, it may be difficult to design a pressure loss in the flow path. For example, when the bypass flow path or the POX flow path after branching is long, or when a plurality of branching portions are provided, the number of pressure loss design elements increases, and the design of the flow path becomes complicated. In addition, it is necessary to cause a gas at a relatively high flow rate to flow through the bypass flow path, while control of a POX flow rate requires a relatively high accuracy, and therefore, it is required to supply a gas at a low flow rate to the POX flow path. Therefore, in a case where a flow path that requires a relatively high control accuracy for the flow rate of gas, such as the POX flow path, is directly branched from a flow path that has a large flow rate, such as the main flow path, it may be difficult to adjust the flow rate of gas and to design the flow path.

In contrast, in the present embodiment, the manifold 4 that distributes and supplies cathode gas to the cathode flow path is attached to the fuel cell unit 10, and the manifold 4 is a configuration including the first, second, and third flow paths 41, 42, 43 respectively connected to the main flow path 21, the bypass flow path 22, and the POX flow path 23 in this order from the upstream side. That is, the main flow path 21 requiring a high flow rate and the first and second flow paths 41 and 42 connected to the bypass flow path 22 are provided on the upstream side, and the third flow path 43 connected to the POX flow path 23 requiring a low flow rate is provided on the most downstream side. Accordingly, a pressure loss of the cathode gas supplied from the manifold 4 to the POX flow path 23 is greater than a pressure loss of the cathode gas supplied to the main flow path 21 and the bypass flow path 22. In this way, the pressure loss of the cathode gas supplied to the main flow path 21 and the bypass flow path 22 that require a high flow rate is small, and the pressure loss of the cathode gas supplied to the POX flow path 23 that requires a low flow rate is large, and therefore, the design of a pressure loss in the cathode flow path is facilitated. In addition, since the cathode gas is distributed to the main flow path 21, the bypass flow path 22, and the POX flow path 23 by using the manifold 4, the number of components is reduced as compared with a case where a plurality of branching portions are provided in the cathode flow path, and cost reduction, simplification of assembly, reduction in operation process, and miniaturization of the system are implemented. Since the manifold 4 is attached to the fuel cell unit 10 including the fuel cell stacks 1, the heat exchanger, and the gas flow paths such as the anode flow path and the cathode flow path, a distance between the manifold 4 and the fuel cell stack 1 or the gas flow path can be reduced. Therefore, the main flow path 21, the bypass flow path 22, and the POX flow path 23 can be shortened, and the pressure loss design of each flow path is further facilitated.

Hereinafter, details of the manifold 4 will be described.

Figure 2:
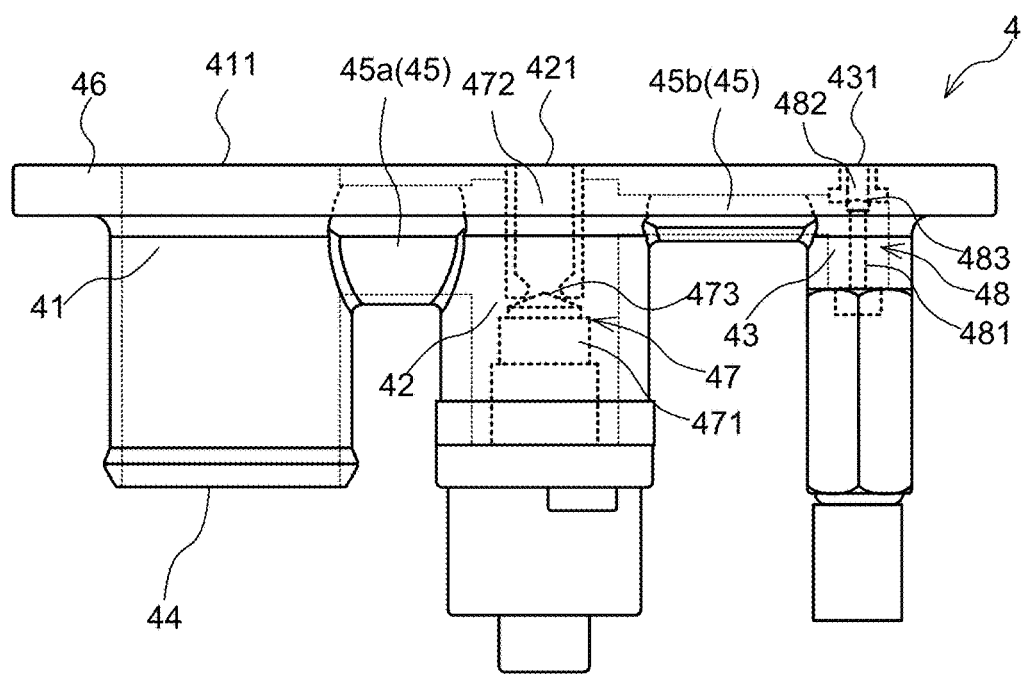
FIG. 2 is a schematic top view of a manifold.
Figure 3:
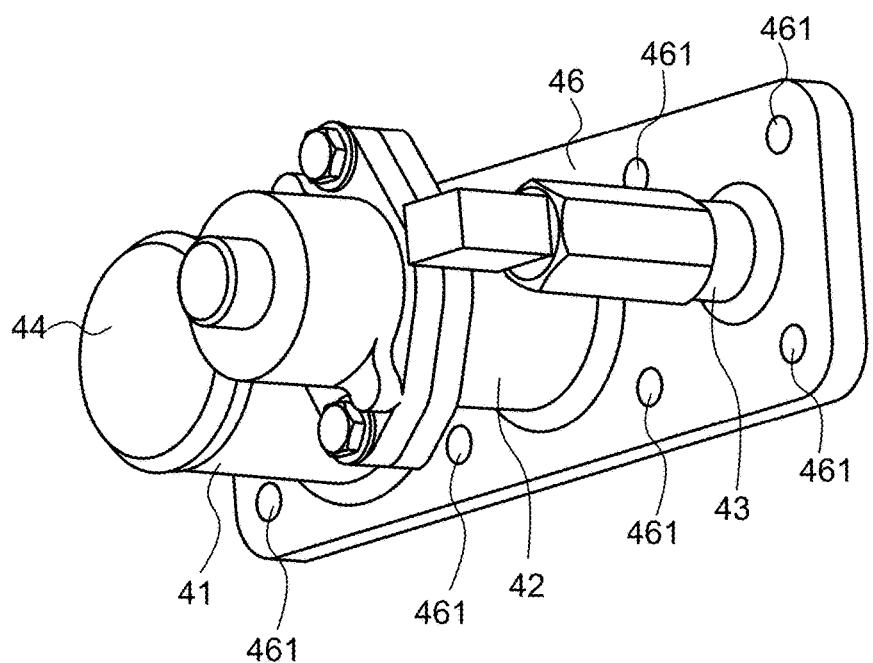
FIG. 3 is a perspective view of the manifold.

FIG. 2 is a schematic top view of the manifold 4, and FIG. 3 is a perspective view of the manifold 4. FIGS. 2 and 3 both show a state where the manifold 4 is removed from the fuel cell unit 10.

As described above, the manifold 4 is a member that distributes and supplies the cathode gas to the cathode flow path of the fuel cell unit 10. As shown in FIGS. 2 and 3, the manifold 4 integrally includes the first flow path 41, the second flow path 42 provided adjacent to the first flow path 41, and the third flow path 43 provided adjacent to the second flow path 42 in this order from a side close to the inlet 44 (that is, the upstream side). The first flow path 41 is a flow path through which the cathode gas is supplied to the main flow path 21 of the cathode flow path, the second flow path 42 is a flow path through which the cathode gas is supplied to the bypass flow path 22, and the third flow path 43 is a flow path through which the cathode gas is supplied to the POX flow path 23.

The manifold 4 includes a communication path 45 including a first communication path 45a that connects the first flow path 41 and the second flow path 42, and a second communication path 45b that connects the second flow path 42 and the third flow path 43. As shown in FIG. 2, the second communication path 45b has a smaller flow path cross-sectional area than the first communication path 45a. The second communication path 45b has a longer passage length than the first communication path 45a.

A first control valve 47 that adjusts the amount of the cathode gas distributed to the bypass flow path 22 is provided on the second flow path 42 of the manifold 4, and a second control valve 48 that adjusts the amount of the cathode gas distributed to the POX flow path 23 is provided on the third flow path 43.

The first control valve 47 is a stepping motor valve, and includes an electric first valve body 471, a hollow cylindrical first valve cylinder 472 fixed to the second flow path 42, and a first valve seat 473 provided at a distal end of the first valve cylinder 472. A hollow portion of the first valve cylinder 472 is a passage through which the cathode gas passes, and is connected to the bypass flow path 22. An opening degree of the first control valve 47 is adjusted by controlling a position of the first valve body 471 by a stepping motor, and the flow rate (bypass flow rate) of the cathode gas distributed to the bypass flow path 22 is adjusted accordingly.

The second control valve 48 is a solenoid valve, and includes a second valve body 481 that opens and closes the third flow path 43, a hollow cylindrical second valve cylinder 482 fixed to the third flow path 43, and a second valve seat 483 provided at a distal end of the second valve cylinder 482. A hollow portion of the second valve cylinder 482 is a passage through which the cathode gas passes, and is connected to the POX flow path 23. The second control valve 48 is opened and closed by operating the second valve body 481 by an electromagnetic force, and the flow rate (POX flow rate) of the cathode gas distributed to the POX flow path 23 is adjusted accordingly.

The flow rate of the cathode gas supplied from the first flow path 41 to the main flow path 21 can be adjusted by a compressor or the like of the cathode gas supply source.

Since the manifold 4 that distributes the cathode gas to the cathode flow path and the control valve that adjusts the amount of the cathode gas flowing through each flow path are integrated in this way, it is not necessary to provide a control valve as a separate configuration from the manifold 4, and the number of components of the entire system can be reduced.

In a case where the cathode gas is supplied from the compressor (air supply device) into the manifold 4 via the inlet 44, the cathode gas in the manifold 4 is distributed and supplied to the first flow path 41, the second flow path 42, and the third flow path 43. Specifically, a part of the cathode gas is directly supplied from the inlet 44 to the first flow path 41, a part of the cathode gas is supplied from the inlet 44 to the second flow path 42 through the first communication path 45a, and a part of the cathode gas is supplied from the inlet 44 to the third flow path 43 through the first communication path 45a, the second flow path 42, and the second communication path 45b. At this time, the pressure loss of the cathode gas supplied from the inlet 44 to each flow path decreases as the cathode gas is supplied to the upstream flow path. In other words, the pressure loss of the cathode gas before reaching each flow path of the manifold 4 is the smallest in the most upstream first flow path 41 connected to the main flow path 21, the next smallest in the second flow path 42 provided adjacent to the first flow path 41 and connected to the bypass flow path 22, and the largest in the most downstream third flow path 43 connected to the POX flow path 23. Accordingly, the pressure loss of the cathode gas supplied to the main flow path 21 and the bypass flow path 22 that require a high flow rate is small, and the pressure loss of the cathode gas supplied to the POX flow path 23 requiring a low flow rate is large, and therefore, the design of a pressure loss in the cathode flow path is facilitated.

In addition, since the second communication path 45b on the downstream side of the communication path 45 has a smaller flow path cross-sectional area than the first communication path 45a on the upstream side, the pressure loss of the cathode gas in the second communication path 45b is larger than that in the first communication path 45a. Therefore, the pressure loss of the cathode gas supplied to the POX flow path 23 requiring a low flow rate becomes larger, and the design of the pressure loss in the cathode flow path is further facilitated.

Since the second communication path 45b on the downstream side has a longer passage length than the first communication path 45a on the upstream side, the pressure loss of the cathode gas in the second communication path 45b is larger than that in the first communication path 45a due to a difference in length. Therefore, the pressure loss of the cathode gas supplied to the POX flow path 23 requiring a low flow rate becomes larger, and the design of the pressure loss in the cathode flow path is further facilitated.

Further, the flow of the cathode gas supplied to the third flow path 43 through the first communication path 45a and the second communication path 45b is blocked by the first control valve 47 provided on the second flow path 42 at the time of crossing the second flow path 42. Therefore, the pressure loss of the cathode gas supplied from the third flow path 43 to the POX flow path 23 is further increased, and the design of the pressure loss in the cathode flow path is further facilitated.

The manifold 4 includes a flange 46 formed to surround the first flow path 41, the second flow path 42, and the third flow path 43. As shown in FIG. 3, flange fixing portions 461 are formed at peripheral edges of the flange 46 so as to surround the first flow path 41, the second flow path 42, and the third flow path 43. The manifold 4 is fixed to the housing 3 such that an outlet 411 of the first flow path 41, an outlet 421 of the second flow path 42, and an outlet 431 of the third flow path 43 overlap the gas supply ports of the housing 3 connected to the main flow path 21, the bypass flow path 22, and the POX flow path 23, respectively (FIGS. 1 and 2). The manifold 4 is fixed to the fuel cell unit 10 (housing 3) by bolts or the like in the flange fixing portions 461 formed to surround the first flow path 41, the second flow path 42, and the third flow path 43 (FIG. 1). The flange fixing portions 461 that fix the manifold 4 to the fuel cell unit 10 are formed so as to surround the first flow path 41, the second flow path 42, and the third flow path 43 in this way, and therefore, the attachment rigidity and the attachment strength of the manifold 4 are improved, and the attachment surface pressure is made uniform. Accordingly, the sealing performance at connection portions between the flow paths 41, 42, 43 of the manifold 4 and the cathode flow path in the fuel cell unit 10 is improved.

Next, details of the first control valve 47 and the second control valve 48 will be described.

As described above, the first control valve 47 includes the electric first valve body 471, the first valve cylinder 472 fixed to the second flow path 42, and the first valve seat 473 provided at the distal end of the first valve cylinder 472. The second control valve 48 includes the second valve body 481 that opens and closes the third flow path 43, the second valve cylinder 482 fixed to the third flow path 43, and the second valve seat 483 provided at the distal end of the second valve cylinder 482.

Figure 4:
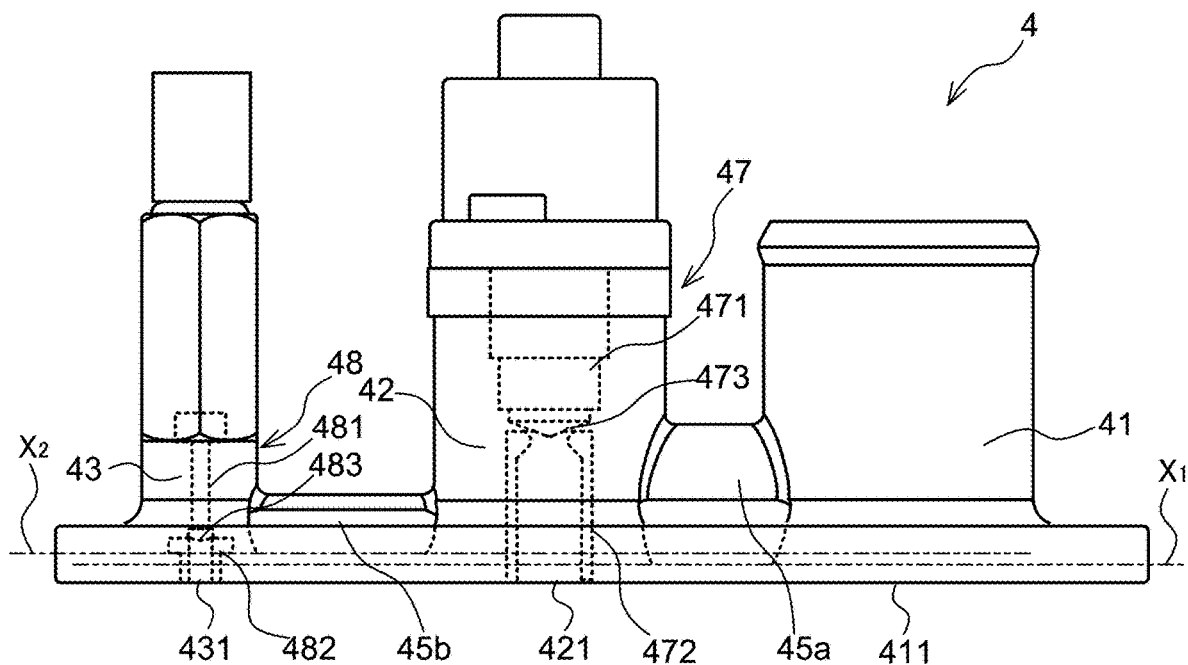
FIG. 4 is a view in which the manifold is disposed such that outlets of a first flow path, a second flow path, and a third flow path are on a lower side.

As shown in FIG. 4, when the manifold 4 is installed such that the outlet 411 of the first flow path 41, the outlet 421 of the second flow path 42, and the outlet 431 of the third flow path 43 are at a lower side, the first valve seat 473 is located above bottom portions of the first communication path 45a and the second communication path 45b. That is, the first valve seat 473 is located above a straight line $X_1$ indicating a height of the bottom portion of the first communication path 45a and a straight line $X_2$ indicating a height of the bottom portion of the second communication path 45b in FIG. 4. Similarly, when the manifold 4 is installed such that the outlet 411 of the first flow path 41, the outlet 421 of the second flow path 42, and the outlet 431 of the third flow path 43 are on the lower side, the second valve seat 483 is located above the bottom portions of the first communication path 45a and the second communication path 45b. That is, the second valve seat 483 is located above the straight line $X_1$ and the straight line $X_2$ of the second communication path 45b in FIG. 4. Accordingly, even when dew condensation water stays in the communication path 45, the first valve body 471 and the second valve body 481 are prevented from being frozen and stuck because the first valve seat 473 and the second valve seat 483 are located above the bottom portions of the first communication path 45a and the second communication path 45b. That is, since the first valve body 471 and the second valve body 481 are located above the first valve seat 473 and the second valve seat 483, respectively, the dew condensation water does not reach the first valve body 471 and the second valve body 481, and the first valve body 471 and the second valve body 481 are prevented from being frozen and stuck.

Figure 5:
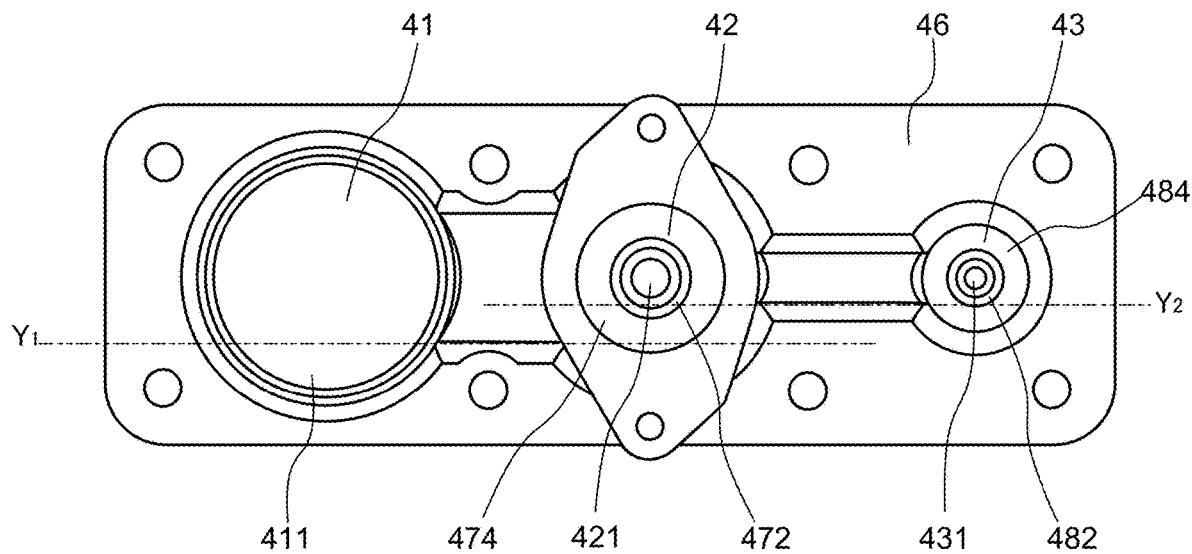
FIG. 5 is a front view of the manifold in a state of being removed from a fuel cell unit.

FIG. 5 is a front view of the manifold 4 in a state of being removed from the fuel cell unit 10, and is a view seen from a direction of the outlets 411, 421, and 431 of the first flow path 41, the second flow path 42, and the third flow path 43, respectively.

As shown in FIG. 5, the hollow cylindrical first valve cylinder 472 is fixed to the second flow path 42, and the hollow cylindrical second valve cylinder 482 is fixed to the third flow path 43. A first housing 474 which has a cylindrical shape and whose inner peripheral surface is in contact with the first valve cylinder 472 is provided at an outer periphery of the first valve cylinder 472. The first housing 474 surrounds the outer periphery of the first valve cylinder 472, and an outer peripheral surface of the first housing 474 is in contact with an inner peripheral surface of the second flow path 42. Similarly, a second housing 484 which has a cylindrical shape and whose inner peripheral surface is in contact with the second valve cylinder 482 is provided at an outer periphery of the second valve cylinder 482. The second housing 484 surrounds the outer periphery of the second valve cylinder 482, and an outer peripheral surface of the second housing 484 is in contact with an inner peripheral surface of the third flow path 43. By providing the housings 474 and 484 in this manner, outer peripheral edges of the first valve seat 473 and the second valve seat 483 located at the distal ends of the first valve cylinder 472 and the second valve cylinder 482 are close to center portions of the second flow path 42 and the third flow path 43 by a thickness of the housings 474 and 484, respectively. Therefore, when the manifold 4 is installed such that the flow directions of the first flow path 41, the second flow path 42, and the third flow path 43 are horizontal to the ground, lower portions of the first valve seat 473 and the second valve seat 483 are located above the housings 474 and 484 by a thickness of the housings 474 and 484 as compared with a case where the housings 474 and 484 are not provided. For example, in FIG. 5, since the first housing 474 and the second housing 484 are provided, the first valve seat 473 and the second valve seat 483 are located above the bottom portions of the first communication path 45a and the second communication path 45b (in FIG. 5, the first valve cylinder 472 and the second valve cylinder 482 are located above the bottom portions of the first communication path 45a and the second communication path 45b, but the first valve seat 473 and the second valve seat 483 are located at the same height as the first valve cylinder 472 and the second valve cylinder 482). That is, the first valve seat 473 and the second valve seat 483 are located above a straight line $Y_1$ indicating the height of the bottom portion of the first communication path 45a and a straight line $Y_2$ indicating the height of the bottom portion of the second communication path 45b in FIG. 5. The first valve seat 473 and the second valve seat 483 are located above the first housing 474 and the second housing 484, respectively, in this way, and therefore, the first valve body 471 and the second valve body 481 are prevented from being frozen and stuck even when dew condensation water stays in the communication path 45. That is, since the first valve body 471 and the second valve body 481 are provided at positions having the same height as the first valve seat 473 and the second valve seat 483, respectively, the dew condensation water staying in the communication path 45 does not reach the first valve body 471 and the second valve body 481, and the first valve body 471 and the second valve body 481 are prevented from being frozen and stuck.

Figure 6:
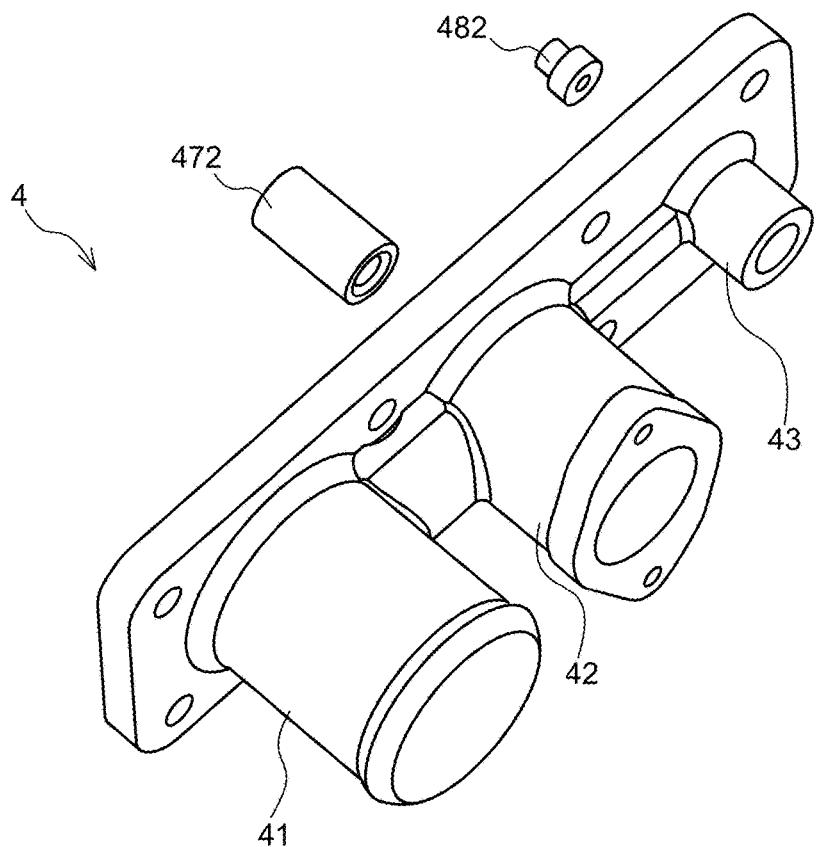
FIG. 6 is a view showing a state where a first valve cylinder and a second valve cylinder are removed from the manifold.

The first valve cylinder 472 of the first control valve 47 is attachable to and detachable from the second flow path 42, and the second valve cylinder 482 of the second control valve 48 is attachable to and detachable from the third flow path 43. FIG. 6 is a perspective view of the manifold 4 in a state of being removed from the fuel cell unit 10, and is a view in a state where the first valve cylinder 472 and the second valve cylinder 482 are removed from the manifold 4. The first valve cylinder 472 and the second valve cylinder 482 are fixed to the second flow path 42 and the third flow path 43, for example, by being screwed into the second flow path 42 and the third flow path 43, respectively. As described above, the first valve cylinder 472 and the second valve cylinder 482 are formed in a hollow cylindrical shape, and the hollow portion is a passage through which the cathode gas passes. Therefore, by using the first valve cylinder 472 and the second valve cylinder 482 having different sizes of the hollow portion, an adjustment range of the flow rate of the cathode gas supplied to the bypass flow path 22 and the POX flow path 23 can be changed. In the present embodiment, since the first valve cylinder 472 and the second valve cylinder 482 are attachable to and detachable from the second flow path 42 and the third flow path 43, respectively, the adjustment range of the flow rate can be changed only by replacing the first valve cylinder 472 and the second valve cylinder 482 without replacing the entire manifold 4. As shown in FIG. 6, the first valve cylinder 472 and the second valve cylinder 482 are inserted into the second flow path 42 and the third flow path 43, respectively, from the same direction, thereby being attached. Since the first valve cylinder 472 and the second valve cylinder 482 can be inserted into the second flow path 42 and the third flow path 43, respectively, from the same direction in this way, workability at the time of assembly is improved.

With the fuel cell system 100 according to the first embodiment, the following effects can be obtained.

The fuel cell system 100 includes the manifold 4 that is attached to the fuel cell unit 10 and that distributes and supplies cathode gas to a cathode flow path. The cathode flow path includes the main flow path 21 that passes through a heat exchanger, the bypass flow path 22 that bypasses the heat exchanger and is connected to the main flow path 21, and the POX flow path (partial reformation flow path) 23 that supplies gas for partial oxidation reformation to an anode flow path. The manifold 4 is configured as a gas distribution member including, in order from an upstream side, the first flow path 41 connected to the main flow path 21, the second flow path 42 provided adjacent to the first flow path 41 and connected to the bypass flow path 22, and the third flow path 43 provided adjacent to the second flow path 42 and connected to the POX flow path (partial reformation flow path) 23. In this way, the main flow path 21 requiring a high flow rate and the first and second flow paths 41 and 42 connected to the bypass flow path 22 are provided on the upstream side, and the third flow path 43 connected to the POX flow path 23 requiring a low flow rate is provided on the most downstream side. Accordingly, a pressure loss of the cathode gas supplied from the manifold 4 to the POX flow path (partial reformation flow path) 23 is larger than a pressure loss of the cathode gas supplied to the main flow path 21 and the bypass flow path 22. That is, the pressure loss of the cathode gas supplied to the main flow path 21 and the bypass flow path 22 that require a high flow rate is small, and the pressure loss of the cathode gas supplied to the POX flow path (partial reformation flow path) 23 that requires a low flow rate is large, and therefore, the design of a pressure loss in the cathode flow path is facilitated.

In addition, since the cathode gas is distributed to the main flow path 21, the bypass flow path 22, and the POX flow path (partial reformation flow path) 23 through the manifold 4, the number of components is reduced as compared with a case where a plurality of branching portions are provided in the cathode flow path. Therefore, it is possible to implement cost reduction, simplification of assembly, reduction in operation process, and miniaturization of the system.

Since the manifold 4 is attached to the fuel cell unit 10 including the fuel cell stacks 1, the heat exchanger, and the gas flow paths such as the anode flow path and the cathode flow path, a distance between the manifold 4 and the fuel cell stack 1 or the gas flow path can be reduced. Therefore, the main flow path 21, the bypass flow path 22, and the POX flow path (partial reformation flow path) 23 can be shortened, and the design of a pressure loss of each flow path is further facilitated.

The manifold 4 of the fuel cell system 100 includes the communication path 45 including the first communication path 45a that connects the first flow path 41 and the second flow path 42, and the second communication path 45b that connects the second flow path 42 and the third flow path 43, and the second communication path 45b has a smaller flow path cross-sectional area than the first communication path 45a. Accordingly, the pressure loss of the cathode gas in the second communication path 45b on the downstream side is larger than that in the first communication path 45a on the upstream side. Therefore, the pressure loss of the cathode gas supplied to the POX flow path (partial reformation flow path) 23 requiring a low flow rate becomes larger, and the design of the pressure loss in the cathode flow path is further facilitated.

In the fuel cell system 100, the second communication path 45b of the manifold 4 is longer than the first communication path 45a. Accordingly, the pressure loss of the cathode gas in the second communication path 45b on the downstream side is larger than that in the first communication path 45a on the upstream side. Therefore, the pressure loss of the cathode gas supplied to the POX flow path (partial reformation flow path) 23 requiring a low flow rate becomes larger, and the design of the pressure loss in the cathode flow path is further facilitated.

The manifold 4 of the fuel cell system 100 includes the first control valve 47 that is provided on the second flow path 42 and that adjusts an amount of cathode gas (bypass flow rate) distributed to the bypass flow path 22, and the second control valve 48 that is provided on the third flow path 43 and that adjusts an amount of cathode gas (POX flow rate) distributed to the POX flow path (partial reformation flow path) 23. Since the manifold 4 that distributes the cathode gas to the cathode flow path and the control valve that adjusts the amount of the cathode gas flowing through each flow path are integrated in this way, it is not necessary to separately provide a control valve, and the number of components of the entire system can be reduced. Therefore, it is possible to implement cost reduction, simplification of assembly, reduction in operation process, and miniaturization of the system.

Since the first control valve 47 that adjusts the bypass flow rate is provided on the second flow path 42, the flow of the cathode gas supplied to the third flow path 43 through the first communication path 45a and the second communication path 45b is blocked by the first control valve 47 at the time of crossing the second flow path 42. Therefore, the pressure loss of the cathode gas supplied from the third flow path 43 to the POX flow path (partial reformation flow path) 23 is further increased, and the design of the pressure loss in the cathode flow path is further facilitated.

The manifold 4 of the fuel cell system 100 includes the flange 46 formed to surround the first flow path 41, the second flow path 42, and the third flow path 43. The flange 46 includes the flange fixing portions 461 for fixing the manifold 4 to the fuel cell unit 10, and the flange fixing portions 461 are formed to surround the first flow path 41, the second flow path 42, and the third flow path 43 of the manifold 4. The flange fixing portions 461 that fix the manifold 4 to the fuel cell unit 10 are formed so as to surround the first flow path 41, the second flow path 42, and the third flow path 43 in this way, and therefore, the attachment rigidity and the attachment strength of the manifold 4 are improved, and the attachment surface pressure is made uniform. Accordingly, the sealing performance at connection portions between the flow paths 41, 42, 43 of the manifold 4 and the cathode flow path in the fuel cell unit 10 is improved.

The first control valve 47 of the fuel cell system 100 includes the first valve body 471, the first valve cylinder 472 fixed to the second flow path 42, and the first valve seat 473 provided at a distal end of the first valve cylinder 472. The second control valve 48 includes the second valve body 481, the second valve cylinder 482 fixed to the third flow path 43, and the second valve seat 483 provided at a distal end of the second valve cylinder 482. When the manifold 4 is attached to the fuel cell unit 10 such that the outlet 421 of the second flow path 42 and the outlet 431 of the third flow path 43 are on the lower side, the first valve seat 473 and the second valve seat 483 are located above the first communication path 45a and the second communication path 45b, respectively. Accordingly, even when the dew condensation water stays in the communication path 45, the first valve body 471 and the second valve body 481 are prevented from being frozen and stuck.

The fuel cell system 100 includes the first housing 474 having a cylindrical shape and surrounding an outer periphery of the first valve cylinder 472, and the second housing 484 having a cylindrical shape surrounding an outer periphery of the second valve cylinder 482. The first housing 474 has an inner peripheral surface in contact with the first valve cylinder 472 and an outer peripheral surface in contact with an inner peripheral surface of the second flow path 42, and the second housing 484 has an inner peripheral surface in contact with the second valve cylinder 482 and an outer peripheral surface in contact with an inner peripheral surface of the third flow path 43. Accordingly, when the manifold 4 is installed such that flow directions of the first flow path 41, the second flow path 42, and the third flow path 43 are horizontal to the ground, lower portions of the first valve seat 473 and the second valve seat 483 are located above the housings 474 and 484 by a thickness of the housings 474 and 484, respectively, as compared with a case where the housings 474 and 484 are not provided. Therefore, even when dew condensation water stays in the communication path 45, the first valve body 471 and the second valve body 481 are prevented from being frozen and stuck.

In the fuel cell system 100, the first valve cylinder 472 is attachable to and detachable from the second flow path 42, and the second valve cylinder 482 is attachable to and detachable from the third flow path 43. Accordingly, an adjustment range of the flow rate can be changed only by replacing the first valve cylinder 472 and the second valve cylinder 482 without replacing the entire manifold 4.

In the fuel cell system 100, the first valve body 471 and the second valve body 481 are attached to the second flow path 42 and the third flow path 43 by being inserted into the second flow path 42 and the third flow path 43, respectively, and insertion directions of the first valve body 471 and the second valve body 481 are the same direction. Since the first valve cylinder 472 and the second valve cylinder 482 can be inserted into the second flow path 42 and the third flow path 43, respectively, from the same direction in this way, workability at the time of assembly is improved.

Figure 7:
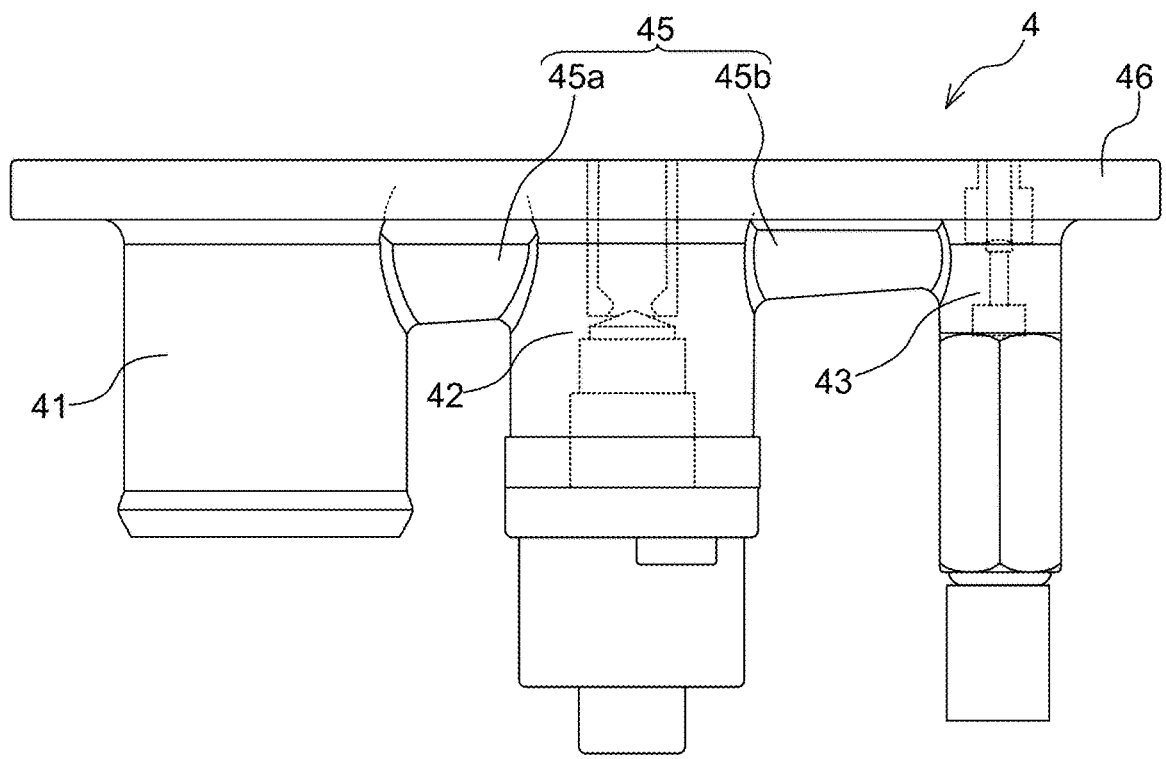
FIG. 7 is a schematic top view of a manifold according to a modification.

In FIG. 2 of the present embodiment, both the first communication path 45a and the second communication path 45b of the manifold 4 are formed in a linear cylindrical shape, but the present invention is not limited thereto. For example, as shown in FIG. 7, the entire communication path 45 may be formed in a tapered shape. Even in such a shape, since a flow path area of the second communication path 45b is smaller than that of the first communication path 45a, the pressure loss of the cathode gas in the second communication path 45b on the downstream side is larger than that in the first communication path 45a on the upstream side. Therefore, the pressure loss of the cathode gas supplied to the POX flow path 23 requiring a low flow rate becomes larger, and the design of the pressure loss in the cathode flow path is further facilitated.

As shown in FIGS. 2 and 7, the flow path cross-sectional area of the second communication path 45b on the downstream side is preferably smaller than that of the first communication path 45a on the upstream side, but the present invention is not necessarily limited thereto, and for example, the flow path cross-sectional areas of the first communication path 45a and the second communication path 45b may be equal. In this case, when the third flow path 43 connected to the POX flow path 23 is provided downstream of the manifold 4, the pressure loss of the cathode gas supplied to the POX flow path 23 also becomes large, and therefore, the design of the pressure loss in the cathode flow path is facilitated.

Similarly, as in the present embodiment, the second communication path 45b of the manifold 4 is preferably longer than the first communication path 45a, but the present invention is not necessarily limited thereto, and for example, the first communication path 45a and the second communication path 45b may have the same length.

As in the present embodiment, the manifold 4 that distributes the cathode gas to the cathode flow path and the control valve that adjusts the amount of the cathode gas flowing to each flow path are preferably integrated, but the present invention is not necessarily limited thereto. For example, the first control valve 47 and the second control valve 48 may be installed downstream of the manifold 4 as a separate configuration from the manifold 4. Only one of the first control valve 47 that adjusts the bypass flow rate and the second control valve 48 that adjusts the POX flow rate may be provided in the manifold 4.

As in the present embodiment, the manifold 4 is preferably fixed to the fuel cell unit 10 by the flange fixing portions 461 of the flange 46, but a method for fixing the manifold 4 to the fuel cell unit 10 is not necessarily thereto, and the fixing method may be any known method.

In the present embodiment, the first control valve 47 is a stepping motor valve, and the second control valve 48 is a solenoid valve, but the present invention is not limited thereto, and the control device that adjusts the amount of the cathode gas may be any known control device.

As in the present embodiment, the housings 474 and 484 are preferably provided on the outer peripheries of the valve cylinders 472 and 482, respectively, but the present invention is not necessarily limited thereto, and the housings 474 and 484 may be not provided.

As in the present embodiment, the valve cylinders 472 and 482 are preferably attachable to and detachable from the same direction, but the present invention is not necessarily limited thereto, and the valve cylinders 472 and 482 may be not detachable, and for example, attachment and detachment directions of the first valve cylinder 472 and the second valve cylinder 482 may be different.

In the present embodiment, the auxiliary machine structure 2 is interposed between the two fuel cell stacks 1, but the number of the fuel cell stacks 1 and a positional relation between the fuel cell stack 1 and the auxiliary machine structure 2 are not necessarily limited thereto, and may be freely set.

Second Embodiment

The fuel cell system 100 according to a second embodiment will be described with reference to FIG. 8. The same elements as those in the first embodiment are denoted by the same reference numerals, and the description thereof is omitted.

Figure 8:
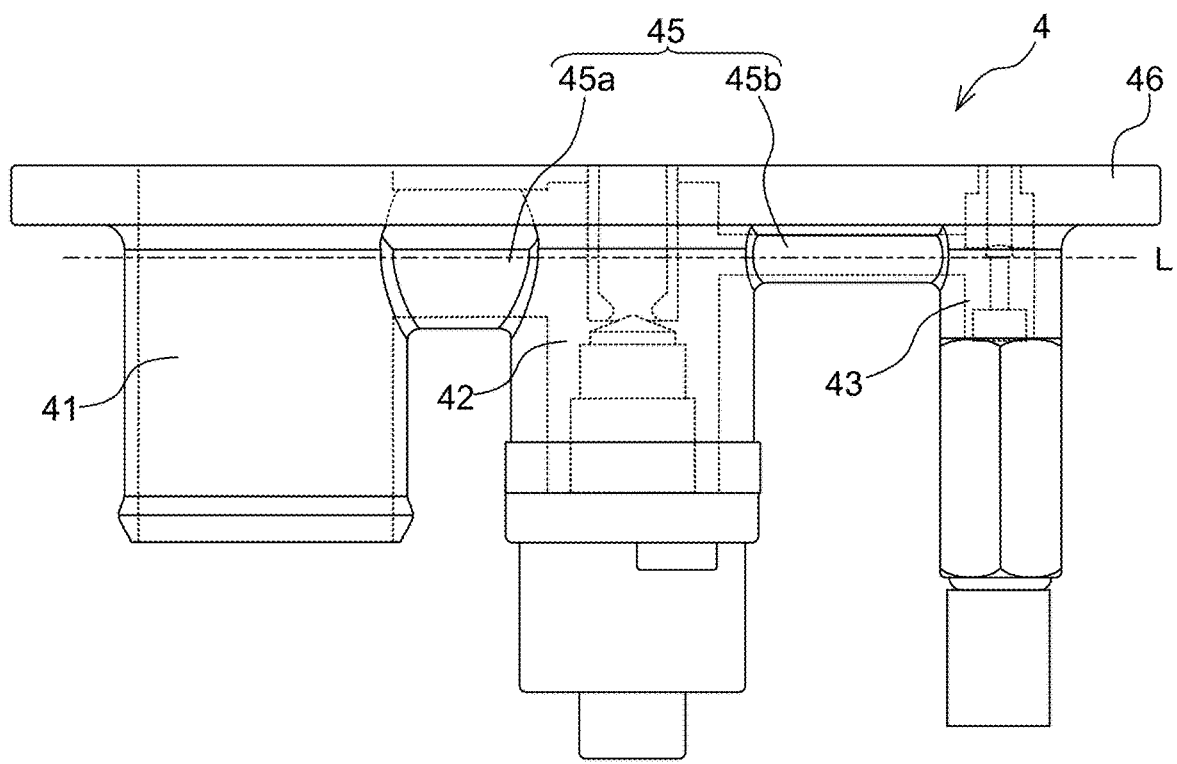
FIG. 8 is a top view of a manifold in a fuel cell system according to a second embodiment.

FIG. 8 is a top view of the manifold 4 in the fuel cell system 100 according to the second embodiment. The present embodiment is different from the first embodiment in positions of the communication path 45 of the manifold 4.

As shown in FIG. 8, in the present embodiment, regarding the communication path 45 of the manifold 4, a flow path area of the second communication path 45b is also smaller than that of the first communication path 45a, and a passage length of the second communication path 45b is also longer than that of the first communication path 45a.

On the other hand, unlike the first embodiment, the first communication path 45a and the second communication path 45b are configured such that central axes L in a flow direction of the cathode gas are the same straight line. Accordingly, a drill or a reamer can be inserted and processed from a hole in one direction (for example, a hole opened in a left wall of the first flow path 41 in FIG. 6) at the time of processing a pipe of the communication path 45. Therefore, the number of processing steps for the pipe of the communication path 45 is reduced, and cost reduction is implemented. In addition, the processing is facilitated, and an error in a diameter of the hole is reduced and the processing accuracy is improved as compared with a case where the pipe of the communication path 45 is processed by casting or the like.

In the present embodiment, the flow path area of the second communication path 45b of the manifold 4 is smaller than that of the first communication path 45a, and the passage length of the second communication path 45b is longer than that of the first communication path 45a, as in the first embodiment, but the present invention is not necessarily limited thereto. For example, the first communication path 45a and the second communication path 45b may have the same flow path area or length.

Figure 9:
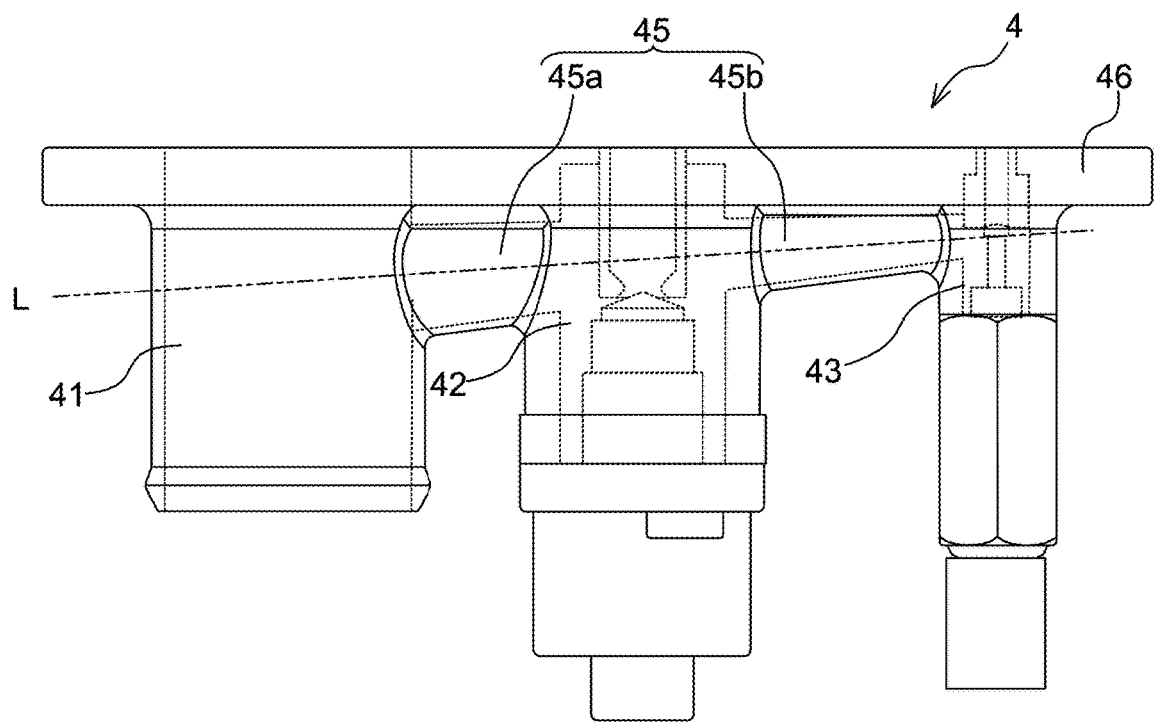
FIG. 9 is a schematic top view of a manifold according to a modification of the second embodiment.

In FIG. 8 of the present embodiment, both the first communication path 45a and the second communication path 45b of the manifold 4 are formed in a linear cylindrical shape, but the present invention is not limited thereto. For example, the entire communication path 45 may be formed in a tapered shape as shown in FIG. 9. Even in such a shape, a drill or a reamer can be inserted from a hole in one direction to process the pipe of the communication path 45 as long as the central axes L of the first communication path 45a and the second communication path 45b are in the same straight line.

Third Embodiment

The fuel cell system 100 according to a third embodiment will be described with reference to FIG. 10. The same elements as those in the other embodiments are denoted by the same reference numerals, and description thereof will be omitted.

Figure 10:
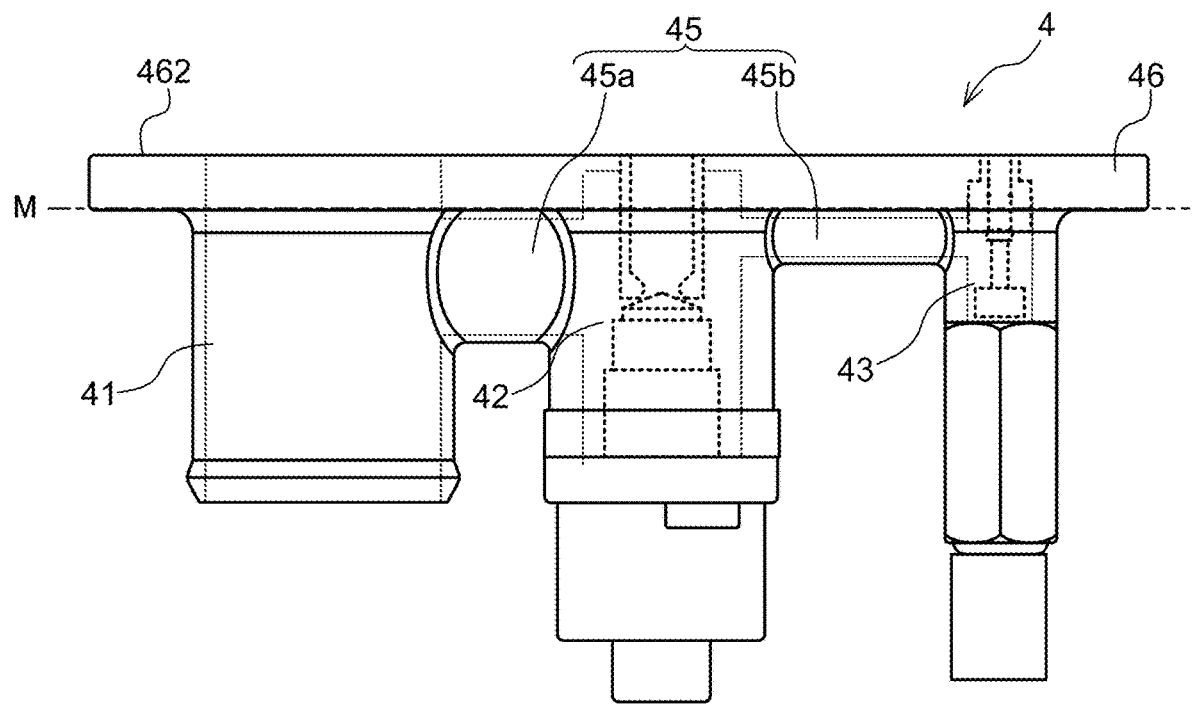
FIG. 10 is a top view of a manifold in a fuel cell system according to a third embodiment.

FIG. 10 is a top view of a manifold in the fuel cell system 100 according to the third embodiment. In the present embodiment, positions of the communication paths 45 of the manifold 4 are different from those in the other embodiments.

As shown in FIG. 10, in the present embodiment regarding the communication path 45 of the manifold 4, a flow path area of the second communication path 45b is also smaller than that of the first communication path 45a, and a passage length of the second communication path 45b is also longer than that of the first communication path 45a, as in the other embodiments.

On the other hand, the first communication path 45a and the second communication path 45b are in contact with a surface of the flange 46 on a straight line (straight line M) as shown in FIG. 10, unlike the other embodiments. Since the communication path 45 comes into contact with the surface of the flange 46 on a straight line in this way, a plate thickness of the flange 46 can be made constant. Accordingly, a surface pressure of a sealing surface 462 of the flange 46 in contact with the fuel cell unit 10 can be made uniform at the time of attaching the manifold 4 to the fuel cell unit 10. Accordingly, the sealing performance at connection portions between the flow paths 41, 42, 43 of the manifold 4 and the cathode flow path in the fuel cell unit 10 is improved.

In the present embodiment, the flow path area of the second communication path 45b of the manifold 4 is also smaller than that of the first communication path 45a, and the passage length of the second communication path 45b is also longer than that of the first communication path 45a, as in the other embodiments, but the present invention is not necessarily limited thereto. For example, the first communication path 45a and the second communication path 45b may have the same flow path area or length.

Fourth Embodiment

The fuel cell system 100 according to a fourth embodiment will be described with reference to FIGS. 11 to 13. The same elements as those in the other embodiments are denoted by the same reference numerals, and description thereof will be omitted.

Figure 11:
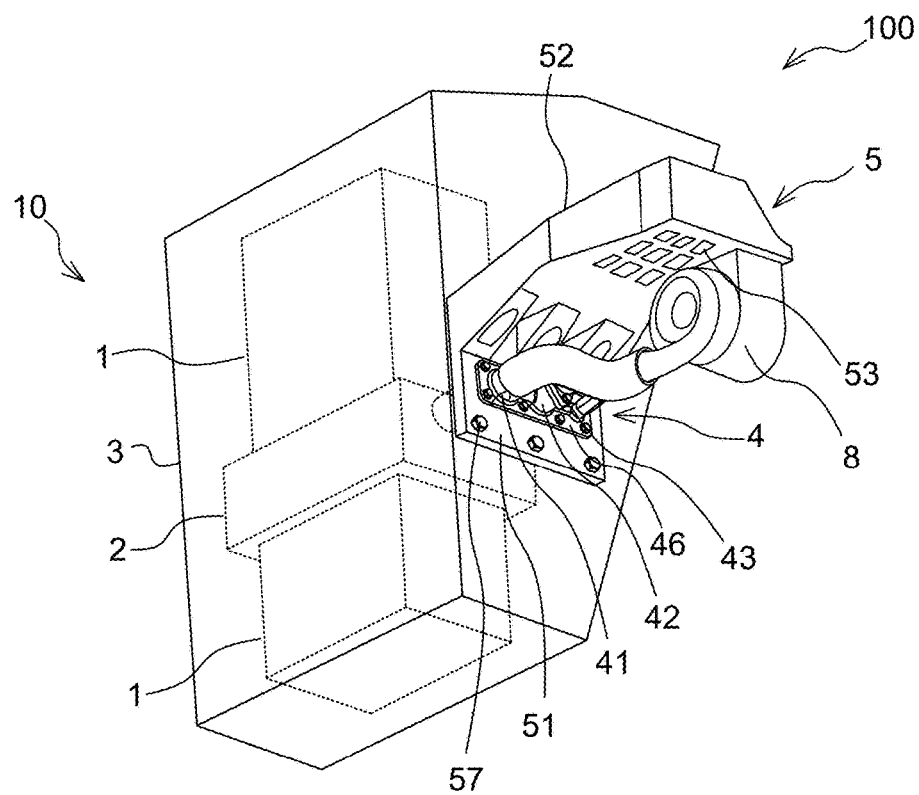
FIG. 11 is a schematic configuration diagram of a fuel cell system according to a fourth embodiment.

FIG. 11 is a schematic configuration diagram of the fuel cell system 100 according to the fourth embodiment. The present embodiment is different from the other embodiments in that the manifold 4 is attached to the fuel cell unit 10 via a bracket 5.

As shown in FIG. 11, in the present embodiment, the bracket 5 that fixes the fuel cell unit 10 to a vehicle equipped with the fuel cell system 100 is attached to the housing 3.

The bracket 5 includes a case-side fixing portion 51 having a surface in contact with a side surface on an outer peripheral side of the housing 3, and an extending portion 52 bent from the case-side fixing portion 51 and extending in a direction substantially perpendicular to the side surface of the housing 3. The manifold 4 is attached to a surface of the case-side fixing portion 51 that is opposite to the surface in contact with the housing 3. As will be described later, the bracket 5 is fixed to a second bracket 7 that is attached to a side member 6 of the vehicle equipped with the fuel cell system 100, on an upper surface of the extending portion 52 (see FIG. 13). A plurality of hollowed holes 53 are formed in a lower surface of the extending portion 52. Accordingly, the weight of the bracket 5 is reduced. Further, a compressor (air supply device) 8 as a cathode gas supply source is attached to the lower surface of the extending portion 52. In addition, the bracket 5 includes a gas supply port that is connected to a gas flow path built in the auxiliary machine structure 2 through a gas supply port of the housing 3.

Figure 12:
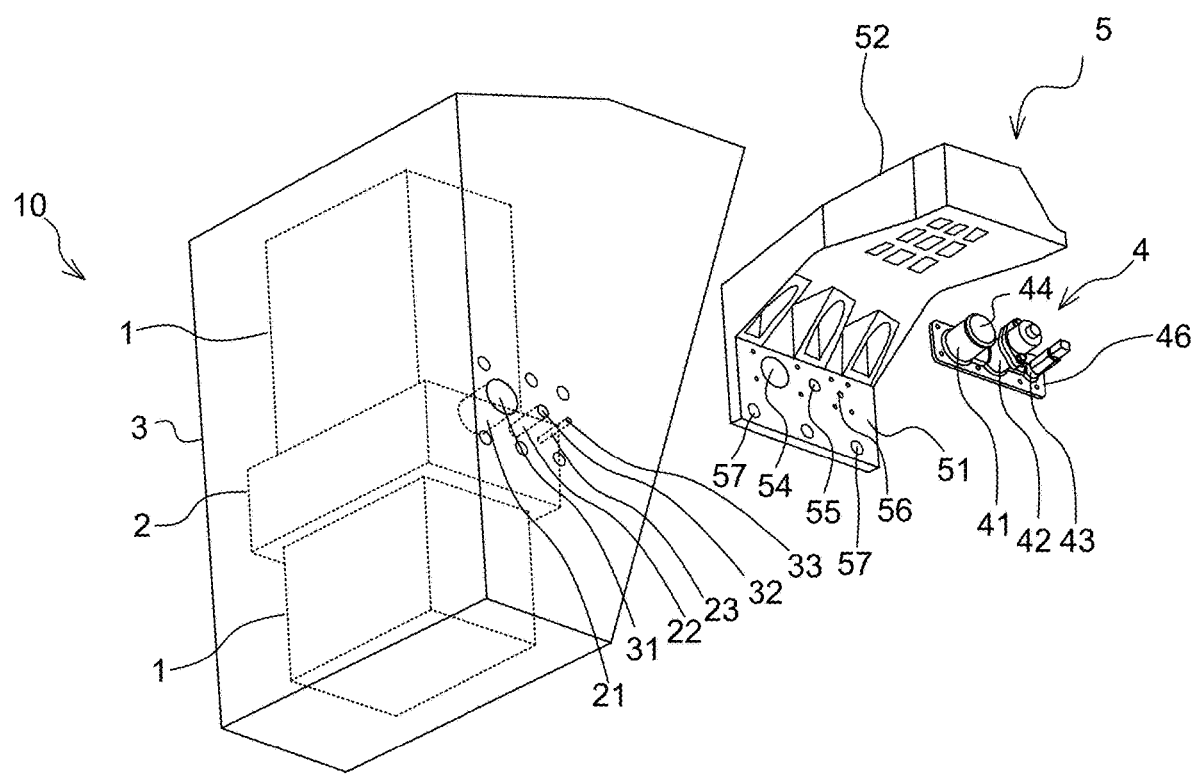
FIG. 12 is a schematic view showing a state where a bracket is removed from a fuel cell unit.

FIG. 12 is a schematic view showing a state where the manifold 4 and the bracket 5 are removed from the fuel cell unit 10 (housing 3). As shown in FIG. 12, the housing 3 includes, on one side surface, a cathode gas supply port 31, a temperature-adjusted gas supply port 32, and a reformed gas supply port 33 as the gas supply ports. The main flow path 21, the bypass flow path 22, and the POX flow path 23 extending from the inside of the auxiliary machine structure 2 to an inner peripheral surface of the housing 3 are fixed to the housing 3 so as to be connected to the cathode gas supply port 31, the temperature-adjusted gas supply port 32, and the reformed gas supply port 33, respectively. On the other hand, the bracket 5 includes, in the case-side fixing portion 51, a first through hole 54, a second through hole 55, and a third through hole 56. The bracket 5 is attached such that the first through hole 54, the second through hole 55, and the third through hole 56 overlap the cathode gas supply port 31, the temperature-adjusted gas supply port 32, and the reformed gas supply port 33 of the housing 3, respectively. Accordingly, the first through hole 54 and the cathode gas supply port 31, the second through hole 55 and the temperature-adjusted gas supply port 32, and the third through hole 56 and the reformed gas supply port 33 form holes through which the cathode gas, the temperature-adjusted gas, and the reformed gas pass, respectively.

As shown in FIG. 11, the flange 46 of the manifold 4 is fixed to the case-side fixing portion 51 of the bracket 5. That is, the manifold 4 is fixed to the fuel cell unit 10 by fixing the flange 46 to the bracket 5. In addition, the manifold 4 is attached to the bracket 5 such that the first flow path 41 is connected to the first through hole 54 of the bracket 5, the second flow path 42 is connected to the second through hole 55 of the bracket 5, and the third flow path 43 is connected to the third through hole 56 of the bracket 5. Therefore, the first flow path 41 of the manifold 4 is connected to the main flow path 21 via the first through hole 54 of the bracket 5 and the cathode gas supply port 31 of the housing 3. Similarly, the second flow path 42 of the manifold 4 is connected to the bypass flow path 22 via the second through hole 55 of the bracket 5 and the temperature-adjusted gas supply port 32 of the housing 3, and the third flow path 43 of the manifold 4 is connected to the POX flow path 23 via the third through hole 56 of the bracket 5 and the reformed gas supply port 33 of the housing 3. The inlet 44 of the manifold 4 is connected to the compressor 8 via a pipe, a hose pipe, or the like.

As shown in FIG. 12, fixing portions 57 are formed in the bracket 5 so as to surround the first through hole 54, the second through hole 55, and the third through hole 56, and as shown in FIG. 11, the bracket 5 is fixed to the housing 3 by bolts or the like at the fixing portions 57.

In this way, the bracket 5 includes the first through hole 54 that connects the first flow path 41 of the manifold 4 and the main flow path 21, the second through hole 55 that connects the second flow path 42 and the bypass flow path 22, and the third through hole 56 that connects the third flow path 43 and the POX flow path 23. Therefore, the bracket 5 that fixes the fuel cell unit 10 to the vehicle equipped with the fuel cell system 100 can also be used as a reinforcing member for connection portions between the cathode flow paths 21, 22, 23 and the manifold 4. Accordingly, the number of components of the system can be reduced, and weight reduction and cost reduction can be implemented as compared with a case where a reinforcing member for the connection portions between the cathode flow paths 21, 22, and 23 and the manifold 4 is separately provided. In addition, when the number of components attached to the housing 3 (fuel cell unit 10) increases, heat dissipation to the outside of the housing 3 through the components increases, but as described above, the number of components is reduced by using the bracket 5 as a reinforcing member, so that the heat dissipation from the housing 3 can be suppressed.

In addition, since the fixing portions 57 that fix the bracket 5 to the fuel cell unit 10 are formed so as to surround the first through hole 54, the second through hole 55, and the third through hole 56, the attachment rigidity and the attachment strength of the bracket 5 are improved, and the attachment surface pressure is made uniform. Accordingly, the sealing performance between the through holes 54, 55, 56 of the bracket 5 and the cathode flow path in the fuel cell unit 10 is improved.

Figure 13:
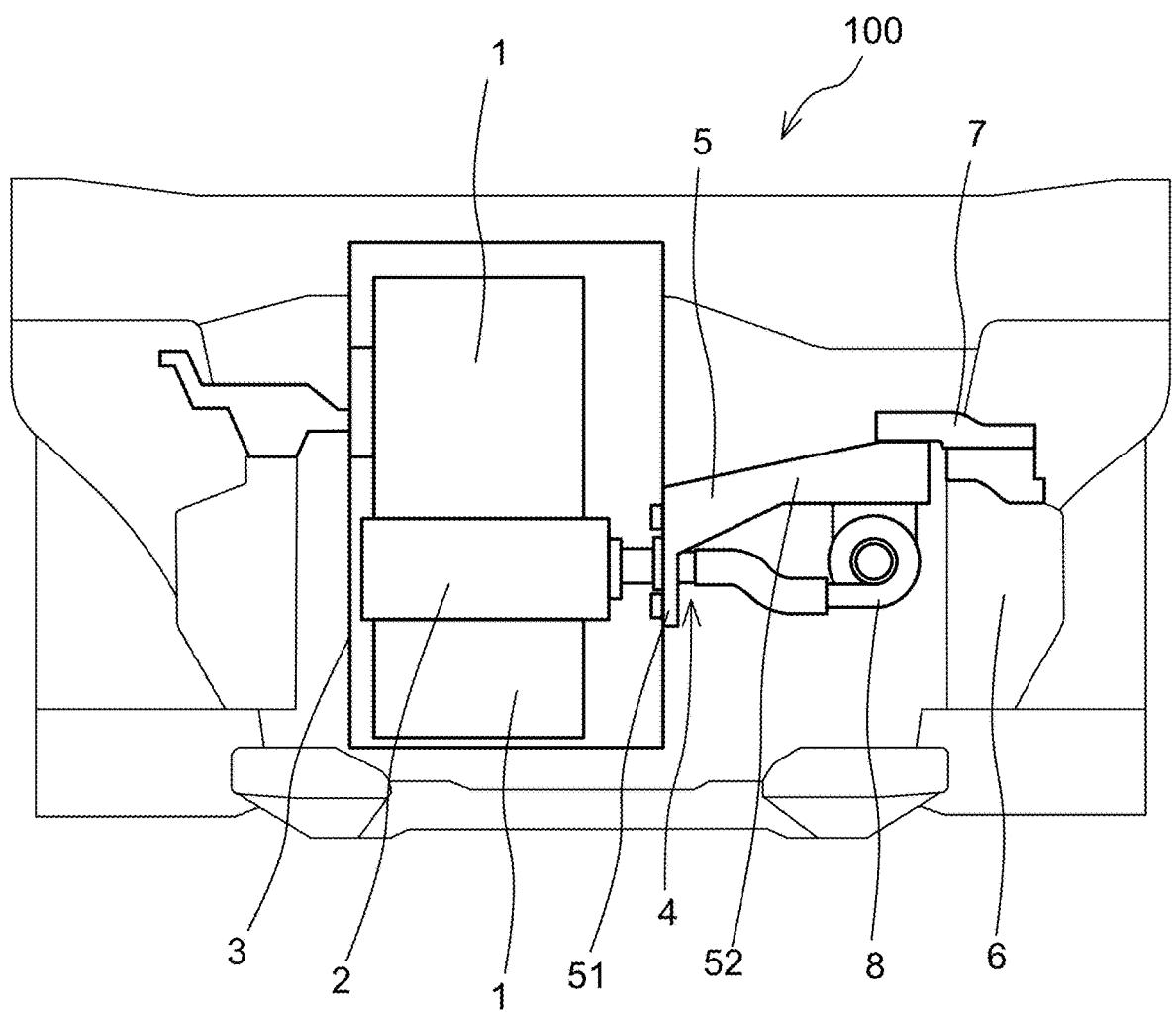
FIG. 13 is a schematic cross-sectional view of a vehicle equipped with the fuel cell system.

FIG. 13 is a schematic cross-sectional view of a vehicle equipped with the fuel cell system 100, as viewed from the front of the vehicle.

As shown in FIG. 13, the second bracket 7 is attached to the side member 6 of the vehicle. The bracket 5 fixed to the fuel cell unit 10 is fixed to the second bracket 7 on the upper surface of the extending portion 52. Accordingly, the fuel cell unit 10 is fixed to the vehicle via the bracket 5. On the other hand, the compressor (air supply device) 8 as a supply source of the cathode gas is attached to the lower surface of the extending portion 52. The compressor 8 is connected to the inlet 44 of the manifold 4 via a pipe or a hose pipe (see FIG. 11). By attaching the compressor 8 to the bracket 5 in this way, a distance from the compressor 8 to the manifold 4 and the cathode flow path can be shortened, and a length of the pipe or the like can be shortened, as compared with a case where the compressor 8 is attached to another position. Therefore, miniaturization, cost reduction, and weight reduction of the system are implemented. In addition, since the compressor 8 is attached to the lower surface of the bracket 5 (extending portion 52), the mobility of the vehicle is improved by lowering the center of gravity.

With the fuel cell system 100 according to the fourth embodiment, the following effects can be obtained.

The fuel cell system 100 is fixed to the vehicle via the bracket 5, and the manifold 4 is fixed to the fuel cell unit 10 by fixing the flange 46 formed to surround the first flow path 41, the second flow path 42, and the third flow path 43 to the bracket 5. The bracket 5 includes the first through hole 54 that connects the first flow path 41 of the manifold 4 and the main flow path 21, the second through hole 55 that connects the second flow path 42 and the bypass flow path 22, and the third through hole 56 that connects the third flow path 43 and the POX flow path (partial reformation flow path) 23. In addition, the fixing portions 57 that fix the bracket 5 to the fuel cell unit 10 are formed to surround the first through hole, the second through hole, and the third through hole. In this way, the bracket 5 that fixes the fuel cell unit 10 to the vehicle equipped with the fuel cell system 100 can also be used as a reinforcing member for connection portions between the cathode flow paths 21, 22, and 23 and the manifold 4. Accordingly, the number of components of the system can be reduced, and weight reduction and cost reduction can be implemented as compared with a case where a reinforcing member for the connection portions between the cathode flow paths 21, 22, and 23 and the manifold 4 is separately provided. In addition, since the number of components is reduced by using the bracket 5 as a reinforcing member, it is possible to suppress heat dissipation from the fuel cell unit 10.

In addition, since the fixing portions 57 that fix the bracket 5 to the fuel cell unit 10 are formed so as to surround the first through hole 54, the second through hole 55, and the third through hole 56, the attachment rigidity and the attachment strength of the bracket 5 are improved, and the attachment surface pressure is made uniform. Accordingly, the sealing performance between the through holes 54, 55, 56 of the bracket 5 and the cathode flow path in the fuel cell unit 10 is improved.

In the fuel cell system 100, the compressor (air supply device) 8 as a cathode gas supply source is attached to the bracket 5. By attaching the compressor (air supply device) 8 to the bracket 5 in this way, a distance from the compressor (air supply device) 8 to the manifold 4 and the cathode flow path is shortened as compared with a case where the compressor (air supply device) 8 is attached to another position. Accordingly, a length of the pipe or the like can be shortened, and miniaturization, cost reduction, and weight reduction of the system can be implemented.

The compressor (air supply device) 8 is preferably attached to the lower surface of the extending portion 52 of the bracket 5 as in the present embodiment, but the present is not necessarily limited thereto, and the compressor 8 may be attached anywhere to the bracket 5.

In addition, in any embodiment, the fuel cell unit 10 is a configuration including the housing 3 that houses the fuel cell stacks 1 and the auxiliary machine structure 2, but the present is not necessarily limited thereto, and the fuel cell unit 10 may not include the housing 3. In this case, the manifold 4 and the bracket 5 are directly attached to the auxiliary machine structure 2.

In addition, in any embodiment, a heat exchanger or a gas flow path such as a cathode flow path is a configuration built in the auxiliary machine structure 2, but the present is not necessarily limited thereto, and the heat exchanger or the gas flow path may be a configuration not using the auxiliary machine structure 2.

Although the embodiments of the present invention have been described above, the above embodiments are merely a part of application examples of the present invention, and are not intend to limit the technical scope of the present invention to the specific configurations of the above embodiments.

Each of the above-described embodiments has been described as a single embodiment, but may be appropriately combined.

The invention claimed is:

1. A fuel cell system comprising:
   a fuel cell unit including a fuel cell, an anode flow path through which an anode gas is supplied to the fuel cell, a cathode flow path through which a cathode gas is supplied to the fuel cell, and a heat exchanger configured to heat the cathode gas to be supplied to the fuel cell; and
   a manifold attached to the fuel cell unit and configured to distribute and supply the cathode gas to the cathode flow path, wherein:
   the cathode flow path includes a main flow path passing through the heat exchanger, a bypass flow path bypassing the heat exchanger and connected to the main flow path, and a partial reformation flow path through which a gas for partial oxidation reformation is supplied to the anode flow path, and
   the manifold is configured as a gas distribution member including, a first flow path connected to the main flow path, a second flow path provided adjacent to and downstream of the first flow path and connected to the bypass flow path, and a third flow path provided adjacent to and downstream of the second flow path and connected to the partial reformation flow path, and includes a communication path including a first communication path configured to connect the first flow path and the second flow path, and a second communication path configured to connect the second flow path and the third flow path.

2. The fuel cell system according to claim 1, wherein the second communication path has a smaller flow path cross-sectional area than the first communication path.

3. The fuel cell system according to claim 1, wherein the communication path is formed in a tapered shape such that a flow path becomes narrower downstream.

4. The fuel cell system according to claim 1, wherein the second communication path is longer than the first communication path.

5. The fuel cell system according to claim 1, wherein the first communication path and the second communication path are configured such that central axes in a flow direction of the cathode gas are in a same straight line.

6. The fuel cell system according to claim 1, wherein the manifold includes at least one of a first control valve provided on the second flow path and configured to adjust an amount of the cathode gas to be distributed to the bypass flow path and a second control valve provided on the third flow path and configured to adjust an amount of the cathode gas to be distributed to the partial reformation flow path.

7. The fuel cell system according to claim 1, wherein the manifold includes a flange formed to surround the first flow path, the second flow path, and the third flow path, and
   the flange of the manifold is fixed to the fuel cell unit.

8. The fuel cell system according to claim 1, wherein the fuel cell unit is fixed to a vehicle via a bracket,
   the manifold includes a flange formed to surround the first flow path, the second flow path, and the third flow path, and is fixed to the fuel cell unit by fixing the flange to the bracket,
   the bracket includes a first through hole connecting the first flow path of the manifold and the main flow path, a second through hole connecting the second flow path and the bypass flow path, and a third through hole connecting the third flow path and the partial reformation flow path, and
   a fixing portion configured to fix the bracket to the fuel cell unit is formed to surround the first through hole, the second through hole, and the third through hole.

9. The fuel cell system according to claim 8, wherein the bracket is attached with an air supply device as a cathode gas supply source.

10. The fuel cell system according to claim 7, wherein the manifold includes a first control valve provided on the second flow path and configured to adjust an amount of the cathode gas to be distributed to the bypass flow path and a second control valve provided on the third flow path and configured to adjust an amount of the cathode gas to be distributed to the partial reformation flow path,
    the flange includes a flange fixing portion for fixing the manifold to the fuel cell unit, and
    the flange fixing portion is formed to surround the first flow path, the second flow path, and the third flow path of the manifold.

11. The fuel cell system according to claim 7, wherein the flange has a uniform plate thickness, and
    the first communication path and the second communication path of the manifold are in contact with a surface of the flange on a straight line.

12. The fuel cell system according to claim 1, wherein the manifold includes a first control valve provided on the second flow path and configured to adjust an amount of the cathode gas to be distributed to the bypass flow path and a second control valve provided on the third flow path and configured to adjust an amount of the cathode gas to be distributed to the partial reformation flow path,
    the first control valve includes a first valve body, a first valve cylinder fixed to the second flow path, and a first valve seat provided at a distal end of the first valve cylinder, and
    the second control valve includes a second valve body, a second valve cylinder fixed to the third flow path, and a second valve seat provided at a distal end of the second valve cylinder.

13. The fuel cell system according to claim 12, wherein the manifold is attached to the fuel cell unit such that an outlet of the second flow path connected to the bypass flow path and an outlet of the third flow path connected to the partial reformation flow path are on a lower side, and
    the first valve seat and the second valve seat are located above bottom portions of the first communication path and the second communication path, respectively.

14. The fuel cell system according to claim 12, further comprising:
- a first housing having a cylindrical shape and surrounding an outer periphery of the first valve cylinder; and
- a second housing having a cylindrical shape and surrounding an outer periphery of the second valve cylinder, wherein
- the first housing has an inner peripheral surface in contact with the first valve cylinder and an outer peripheral surface in contact with an inner peripheral surface of the second flow path, and
- the second housing has an inner peripheral surface in contact with the second valve cylinder and an outer peripheral surface in contact with an inner peripheral surface of the third flow path.

15. The fuel cell system according to claim 12, wherein
- the first valve cylinder is attachable to or detachable from the second flow path, and
- the second valve cylinder is attachable to or detachable from the third flow path.

16. The fuel cell system according to claim 12, wherein
- the first valve cylinder is attachable to or detachable from the second flow path,
- the second valve cylinder is attachable to or detachable from the third flow path,
- the first valve body is attached to the second flow path by being inserted into the second flow path,
- the second valve body is attached to the third flow path by being inserted into the third flow path, and
- the first valve body and the second valve body are inserted in a same direction.

* * * * *